Patented June 11, 1940

2,203,861

UNITED STATES PATENT OFFICE 2,203,861

PREPARATION OF AROMATIC NITRILES

Arden Garrell Deem, Champaign, Ill., and Wilbur Arthur Lazier, Wilmington, Del., assignors to E. I. du Pont de Nemours & Company, Wilmington, Del., a corporation of Delaware No Drawing. Application December 6, 1938, Serial No. 244,232. In Great Britain May 27, 1938

7 Claims. (Cl. 260—465)

This invention relates to the manufacture of aromatic mono- and dinitriles from aromatic dicarboxylic acids and from such derivatives thereof that may be produced by the reaction of ammonia with aromatic dicarboxylic acids or anhydrides. More specifically this invention relates to an improved catalytic process for the preparation of orthophthalonitrile and benzonitrile from phthalic acid, anhydride, amide, or imide.

In our copending application Serial No. 145,508, filed May 29, 1937, now Patent No. 2,149,280, issued March 7, 1939, of which this is a continuation-in-part, we have disclosed a catalytic process for the manufacture of aryl dinitriles, such as o-phthalonitrile, that comprises passing a gaseous mixture of ammonia and an aromatic orthodicarboxylic acid, anhydride, amide, or imide over a suitable dehydrating catalyst at elevated temperatures. In this application we have pointed out that among the wide variety of contact materials that can be employed, those that are merely operable, in the sense that they produce phthalonitrile from phthalimide, and the like, in mediocre yields, are to be distinguished from those that fulfill requirements for economical operation on a large commercial scale. For example, basic aluminum phosphate and basic aluminum sulfate are outstanding catalysts for this process not only because they give o-phthalonitrile in high yields, but because they are further characterized by a remarkable sturdiness, inertness toward the components of the gaseous reaction mixture, and by their sustained high catalytic activity over long periods of continuous operation.

It is the object of this invention to provide an additional group of catalysts which may be employed successfully for the above purpose.

We have found that the oxides of zirconium, beryllium, tungsten and vanadium show a surprising similarity in their behavior as dehydrating catalysts for the above reaction; and owing to their durability, long life, and high activity they are particularly valuable for this purpose from the commercial point of view. Moreover, although it has been known for many years that each member of this group possesses dehydrating properties to a greater or less degree in reactions involving alcohols, this invention is a novel and important contribution to the art of manufacturing aromatic dinitriles, which to the best of our knowledge and belief was unknown prior to our discovery thereof.

Broadly speaking, our invention comprises producing aromatic dinitriles by bringing a gaseous mixture of ammonia and an aromatic dicarboxylic acid, anhydride, amide or imide into contact continuously with a dehydrating catalyst selected from the group consisting of zirconium oxide, beryllium oxide, tungsten oxide, and vanadium oxide at elevated temperatures and essentially atmospheric pressure. A more full and complete description of our process is given in the following examples, which illustrate but do not otherwise limit the invention.

*Example 1.*—A stream of ammonia is passed at the rate of 272 liters per hour through a tube containing 500 cc. of tungsten oxide catalyst maintained at a temperature of 400° C. Phthalic anhydride is vaporized and passed with the ammonia at the rate of 118.8 gm. per hour. Under these conditions the molecular ratio of ammonia to phthalic anhydride is 15:1, the space velocity is 580 volumes of gas per unit volume of catalyst per hour, and the contact time is 2.5 seconds. The products issuing from the tube are condensed in a suitable receiver and consist of a slightly greenish solid mass having a pronounced odor of benzonitrile. The product obtained by processing 368.5 gm. of phthalic anhydride during a period of 3.1 hours is extracted with warm benzene until all soluble material is removed. The benzene insoluble residue consists of 69.5 gm. of phthalimide, melting point 222° C., which is suitable for recycling in the process. The solvent is evaporated from the benzene solution and the residue subjected to vacuum fractional distillation. There is obtained 13.1 gm. of pure benzonitrile, boiling point 88° C./26 mm. and 222 gm. of ortho-phthalonitrile, boiling point 150 to 152° C./10 mm., melting point 140 to 141° C. The molecular conversions to phthalimide, phthalonitrile and benzonitrile are 18.9%, 69.7%, and 5.1%, respectively.

*Example 2.*—Five hundred cc. of vanadium oxide-on-alundum catalyst in the form of small lumps is charged into a vertically mounted catalyst tube and heated to a temperature of 400° C. Ammonia is passed through the catalyst bed at the rate of 272 liters per hour. Phthalic anhydride is vaporized and passed in with the ammonia at the rate of 106.8 gm. per hour during a period of twelve hours. Under these conditions the ammonia : phthalic anhydride ratio is 16.9:1, and the contact time is 2.5 seconds. The gaseous products issuing from the reactor tube are condensed to form a faintly yellow powder, which is treated according to the procedure of Example I to recover ortho-phthalonitrile, phthalimide, and benzonitrile. From 1281.6 gm. of phthalic anhydride processed, there is obtained 686 gm. of phthalonitrile, 435 gm. of phthalimide, and 32 gm. of benzonitrile. These amounts correspond respectively to molecular yields of 61.9%, 34.2%, and 3.6% of theory. The recovered phthalimide is of excellent quality and after grinding is suitable for mixing with a fresh charge of phthalic anhydride and recycling.

Example 3.—A vigorous stream of ammonia is passed at the rate of 272 liters per hour through a tube containing 500 cc. of zirconium oxide-on-carbon catalyst, which is in the form of small porous lumps. The catalyst is maintained at a temperature of 400° C. Ten hundred forty-two gm. of phthalic anhydride is vaporized and introduced into the ammonia stream at the uniform rate of 93 gm. per hour during a period of 11.2 hours. The vapor stream issuing from the tube is passed into a cooled receiver where the product separates as a finely divided powder. Water vapor is vented to a separate trap. This powder is stirred with approximately five times its weight of warm benzene until no more of the solid dissolves. Filtration removes 152 gm. of phthalimide corresponding to 14.7% of the phthalic anhydride processed. The benzene filtrate is cooled and ortho-phthalonitrile separates in white needles, melting point 141° C. The benzene solution is steam distilled to yield, in addition to solvent, 21.7 gm. of benzonitrile. The solid residue remaining from steam distillation is recrystallized from hot water to recover the remainder of the phthalonitrile. This in combination with that which crystallized from benzene amounts to 656 gm., which represents a molecular yield of 72%. An alternative method of refining that yields ortho-phthalonitrile of a technical grade comprises first steam distilling the crude powdered reaction product to remove benzonitrile and thereafter extracting with cold 5% caustic soda solution to dissolve phthalimide and other alkali-soluble by-products. The mixture is filtered and the filter cake washed thoroughly with cold water and dried. If so desired, this product is further refined by distillation or sublimation.

Example 4.—A vapor mixture of phthalic anhydride and ammonia containing 17.7 moles of ammonia per mole of phthalic anhydride is passed over 500 cc. of a dehydrating catalyst comprising beryllium oxide-on-carbon. The catalyst is maintained at a temperature of 400° C., and during a period of 12 hours a total 1217 gm. of phthalic anhydride is processed. These conditions correspond to a space velocity of 575 volumes of gas per unit volume of catalyst per hour and a contact time of 2.5 seconds. The products obtained from this reaction are worked up according to the procedure described in Example 1. There is obtained 392 gm. of phthalimide, 672 gm. of ortho-phthalonitrile, and 9.3 gm. of benzonitrile. The molecular conversions to these products were respectively 32.5%, 63.2%, and 1.1% of theory.

In the foregoing examples we have recited certain preferred conditions of operation. However, we wish to make it clear that our invention is capable of wide variation and modification without departing from the spirit thereof. For example, the process of this invention may be carried out at elevated catalyst temperatures in the range from about 300° to about 550° C. Similarly, the molecular ratio of ammonia to phthalic anhydride may be varied considerably within practicable limits, although it is preferable to employ ammonia ratios in the neighborhood of 15 to 20.

In the examples we have also mentioned two other important variables: space velocity and contact time. These variables, which are very closely related, serve as a measure of the rate at which the gaseous reactants pass through the catalyst bed. "Space velocity" is defined as the number of volumes of gas calculated as at standard conditions that pass through a unit volume of catalyst in one hour. "Time of contact" is defined as the time in seconds that is required by the gaseous reactants to traverse the entire space occupied by the catalyst at the temperature and pressure of the reaction, assuming no change in volume. The time of contact and space velocity may be calculated from each other by the following expression:

$$\text{Time of contact} = \frac{273 \times 60 \times 60}{(273 + \text{temp. } °C.) \times \text{space velocity}}$$

In the practice of this invention, it is most advantageous to operate with contact times ranging from about two seconds to about twelve seconds.

The catalysts of this invention are conveniently employed either in the form of hard, porous gels or else deposited on some suitable porous support such as charcoal, alundum, pumice, infusorial earth, kaolin, and the like.

The process of this invention is broadly applicable to aromatic dicarboxylic compounds that are capable of reacting with ammonia to produce diamides or imides. In addition to phthalic acid and its derivatives, the process may be applied successfully to other aromatic dicarboxylic compounds such as terephthalic acid, 1,8-naphthalic anhydride, chlorophthalic anhydride, etc., producing their respective dinitriles as the major product of the reaction.

Having given a complete description of our invention, it is to be understood that we do not limit ourselves to the specific embodiments thereof except as defined in the following claims.

We claim:

1. In the process of producing aromatic nitriles by reacting, in the gaseous phase and in the presence of a catalyst, ammonia and a compound selected from the group consisting of aromatic carboxylic acids, their anhydrides, amides and imides, the improvement which consists of employing as catalyst a dehydrating agent selected from the group consisting of the oxides of beryllium, vanadium, zirconium and tungsten.

2. A process for the manufacture of an aryl-dinitrile having the two nitrile groups in adjacent positions, which comprises submitting a gaseous mixture, comprising ammonia and an aryl-dicarboxylic acid derivative of the general formula

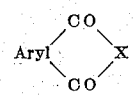

wherein X stands for O or NH, and wherein the CO groups occupy adjacent positions, to a temperature between 300 and 550° C. in the presence of a dehydrating catalyst selected from the group consisting of the oxides of beryllium, vanadium, zirconium and tungsten.

3. A process for the manufacture of aryl dinitriles which comprises heating a gaseous mixture comprising a molecular excess of ammonia and a member of the group consisting of ortho-phthalic acid, ortho-phthalic anhydride, phthalamic acid, phthalimide, and phthalamide at a temperature between 300 and 550° C. for a period of time between about 2 seconds and about 12 seconds in the presence of a catalyst selected from the group consisting of the oxides of beryllium, vanadium, zirconium and tungsten.

4. A process as in claim 3, in which the quantity of ammonia is at least 15 times the amount theoretically required to react with the organic compound undergoing conversion to phthalonitrile.

5. The process of producing an aromatic dinitrile, which comprises passing a gaseous mixture of ammonia and the anhydride of an aromatic dicarboxylic acid, over a catalyst maintained at a temperature between about 400 and 500° C. and being an oxide of the group of beryllium oxide, vanadium oxide, zirconium oxide and tungsten oxide, the rate of passage of the gases being controlled to maintain a contact time between 2 and 12 seconds.

6. A process as in claim 5, in which the molecular ratio of ammonia to aromatic anhydride in the said mixture is between 15 and 20.

7. The process of producing phthalonitrile, which comprises passing a mixture of ammonia and phthalic anhydride in a molal ratio of between 15 and 20, at a temperature between 400 and 500° C. over a catalyst selected from the group consisting of the oxides of beryllium, vanadium, zirconium and tungsten, the rate of flow of gases being controlled so that the resulting contact time is between 2 and 12 seconds.

ARDEN GARRELL DEEM.
WILBUR ARTHUR LAZIER.